No. 628,340. Patented July 4, 1899.
A. A. LEUCHTER.
CYCLOMETER.
(Application filed Jan. 15, 1898.)
(No Model.) 2 Sheets—Sheet 1.
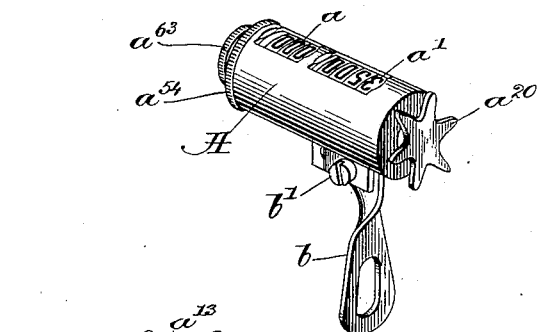
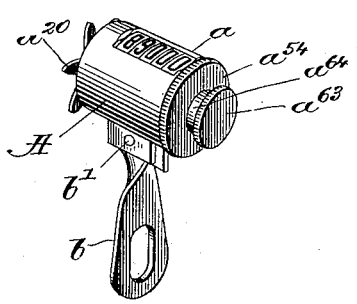
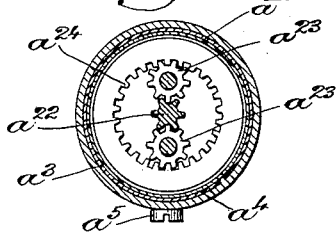
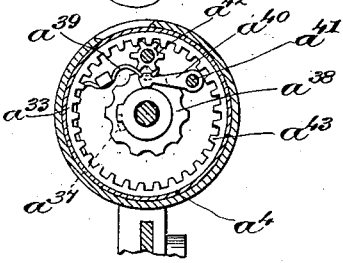
Witnesses:
A. C. Harmon
Edward H. Allen.
Inventor:
Arthur A. Leuchter.
by Crosby Gregory
attys.

No. 628,340. Patented July 4, 1899.
A. A. LEUCHTER.
CYCLOMETER.
(Application filed Jan. 15, 1898.)
(No Model.) 2 Sheets—Sheet 2.
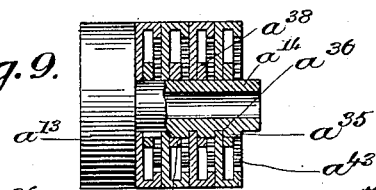
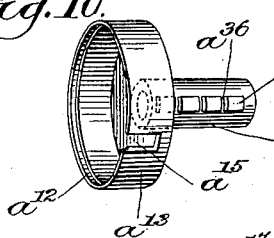
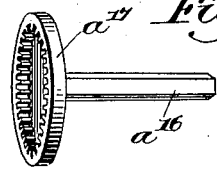
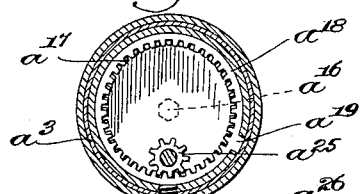
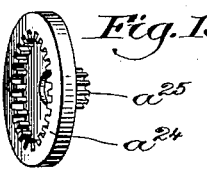
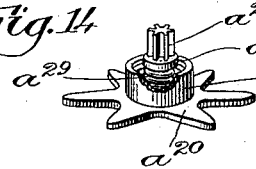
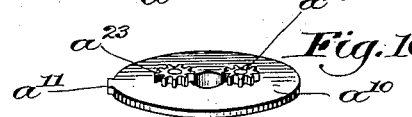
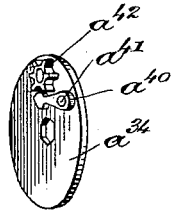
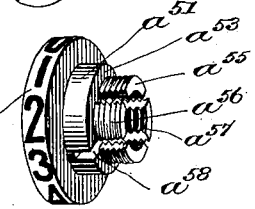
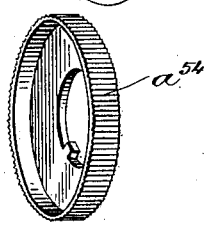
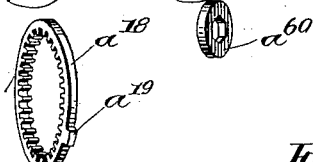
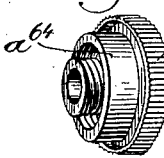
Witnesses:
A. C. Harmon
Edward H. Allen
Inventor:
Arthur A. Leuchter.
by Crosby Gregory
attys.

UNITED STATES PATENT OFFICE.

ARTHUR A. LEUCHTER, OF EVERETT, MASSACHUSETTS.

CYCLOMETER.

SPECIFICATION forming part of Letters Patent No. 628,340, dated July 4, 1899.

Application filed January 15, 1898. Serial No. 666,748. (No model.)

*To all whom it may concern:*

Be it known that I, ARTHUR A. LEUCHTER, of Everett, county of Middlesex, State of Massachusetts, have invented an Improvement in Cyclometers, of which the following description, in connection with the accompanying drawings, is a specification, like letters on the drawings representing like parts.

My invention is an improved registering or recording mechanism, particularly intended for such instruments as cyclometers and the like.

My invention has for its objects the provision of a simple and extremely-compact instrument; also, quickly-operated and convenient resetting mechanism therefor, a central driving-shaft rotating at the proper reduced speed of the fractional-number wheel, a new movement for transmitting the required movement from one number-wheel to the next; also, various improvements new in themselves, as well as combined, which make the instrument entirely dust-proof, together with various improvements in mounting and for assembling the parts of the instrument.

My improved cyclometer or recording instrument comprises a barrel or casing having one or more suitable sight-openings and provided with a continuous internal lining held in closing contact against the inner surface of said barrel and transparent at said openings, said barrel and lining inclosing one or more trains of number-wheels, which in the fully-improved embodiment of my complete invention are provided each with a freely-pivoted dog or detent and a small pinion normally free to revolve but intermittingly held by the detent, a stationary sleeve on which said wheels are mounted, said sleeve having a knob or lump for actuating each detent, a central actuating-shaft for driving said wheels, a star-wheel or other usual propelling device for receiving the initial impulses from the primary source of movement which is being measured, a reducing-gearing of special and novel construction between said star-wheel and the said central shaft and driving the latter, and a resetting device novel as a whole and also in its details, said device being located at the end of said barrel opposite said star-wheel and said numbering-wheels being mounted to read longitudinally of the barrel, holding the latter, with the star-wheel, at the left.

The features which I have thus enumerated as in general constituting my invention are new both in themselves and in combination with each other, and also my invention comprises various other novel features, which will be more particularly explained in the course of the following description of the entire invention as it is herein shown in its other embodiments.

In the drawings, Figure 1 is a perspective view of my improved measuring device in its complete embodiment. Fig. 2 is a similar view showing a more compact form thereof. Figs. 3 and 4 are central vertical longitudinal sectional views, respectively, of the instrument shown in Figs. 1 and 2. Fig. 5 is a fragmentary sectional view of a form of my device to be explained. Fig. 6 is a vertical transverse section taken on the line 6 6, Fig. 3. Fig. 7 is a similar sectional view taken on the line 7 7, Fig. 3. Fig. 8 is a sectional detail illustrating the position of the parts shown in Fig. 7 when the detent is moved into operative position. Fig. 9 is a top plan view, partly in section and partly broken away, of the number-wheels in operative position. Figs. 10, 11, and 13 are perspective views, respectively, of one of the sleeves and its head, the central actuating-shaft and its gear, and intermediate gear and epicyclic pinion forming part of the reducing mechanism. Fig. 12 is a sectional view on the line 12 12, Fig. 3, showing the above parts in assembled position within the barrel, this view also showing the stationary ring of Fig. 20. Fig. 14 is a perspective view of the star-wheel and a threaded annulus carried thereby. Figs. 15 and 16 are opposite views, in perspective, of a stationary disk coöperating with said threaded annulus to make a close housing and joint at one end of the instrument and also showing a pair of idlers for communicating motion. Fig. 17 is a perspective view of one of the number-wheels. Fig. 18 is a similar view of one of the number-wheels and its connected resetting-hub, Figs. 19, 21, 22, and 24 being perspective views of other details of the resetting attachment. Figs. 20 and 23 are perspective views of details, to be referred to.

I have mounted my improved mechanism in a barrel or cylindrical casing A for compactness, convenience, and neatness of appearance, this casing being provided with one or more sight-openings $a$ $a'$, and preferably having a lug $a^2$ at its under side split for the reception of a slotted bracket $b$, secured therein by a clamping-screw $b'$ for properly mounting the cyclometer on a bicycle or in other desired location.

Heretofore various devices and expedients have been resorted to with more or less success for rendering instruments of this character moisture and dust proof; but, so far as I am aware, they have either been awkward in appearance or unsuccessful in accomplishing their purpose. Accordingly I have provided means which effectually accomplishes its purpose, said means consisting of a sheet of celluloid or other preferably transparent flexible material $a^3$, extending from one end of the barrel to the other and lining the entire inner surface thereof, the ends of the celluloid being carefully matched together, as indicated at $a^4$, Figs. 6 and 7, and being perforated to receive retaining-screws $a^5$ $a^6$, and preferably held in extended position by a flange $a^7$ of an end retaining-ring $a^8$ in connection with other parts, all of which will be more particularly described in the proper place later on.

Within the barrel A, next to its closed head $a^9$, I mount a circular plate $a^{10}$, shown in detail in Figs. 15 and 16, where it will be seen that it has at one side a projecting lug or nib $a^{11}$ to prevent its rotation, this plate being held in an edge flange $a^{12}$ (see Fig. 10) of a drum-like head $a^{13}$ of a sleeve $a^{14}$. Said head $a^{13}$ has a notch $a^{15}$ to receive the nib $a^{11}$, and is held rigidly in place within the barrel by the set-screw $a^5$, as is clearly shown in Figs. 3 and 4.

Within the drum-like head $a^{13}$ and the sleeve $a^{14}$ I mount a central actuating-shaft $a^{16}$, preferably polygonal, and which constitutes a very important feature of my invention, and carries at its forward or left-hand end, Figs. 3 and 4, an internal toothed gear $a^{17}$, fast to the shaft and rotating therewith, a stationary internal gear or toothed ring $a^{18}$, Fig. 20, being mounted immediately adjacent the rotating gear $a^{17}$, said ring being held against rotation by a nib or other suitable means $a^{19}$, engaging the slot $a^{15}$, before mentioned.

The two gears last mentioned constitute a part of the reducing mechanism for properly reducing the speed of movement transmitted from a star-wheel $a^{20}$, carried at the extreme forward end of the instrument and having its spindle $a^{21}$ provided at its inner end with a pinion $a^{22}$, in mesh with idlers $a^{23}$, shown as two in number, in order to give a balanced effect, these idlers being mounted on studs projecting from the inner face of the plate $a^9$, as shown in detail in Fig. 16.

The idlers $a^{23}$ transmit the motion from the pinion $a^{22}$ to an internal toothed disk $a^{24}$, Fig. 13, which carries a planetary wheel or pinion $a^{25}$, having a width sufficient to overlap and engage the teeth of both the gears $a^{17}$ $a^{18}$, as clearly shown in Figs. 3 and 4.

Viewing Fig. 12, it will be observed that the teeth of the gears $a^{17}$ $a^{18}$ do not exactly correspond, but that, as herein shown, the gear or ring $a^{18}$ has one more tooth than the gear $a^{17}$, the result being, it being remembered, that the former is stationary and the latter rotatable, that the gear $a^{17}$ is moved a distance of one tooth for every revolution of the pinion $a^{25}$, and thereby the speed is reduced to the desired amount in order to transmit a recording motion from the shaft $a^{16}$ to the number-wheels.

I regard the placing of the reducing mechanism between the star-wheel and the actuating-shaft as of much importance and as constituting a main novelty of my invention.

Viewing Figs. 14 and 15 in connection with Figs. 3 and 4, it will be observed that the plate $a^{10}$ is provided on its outer side with a threaded hub $a^{26}$ and that the spindle $a^{21}$ of the star-wheel has a fixed collar $a^{27}$ and a loose cap-nut $a^{28}$, between which and the collar is a spring $a^{29}$, the cap-nut being internally threaded to screw onto the hub $a^{26}$. By this provision the adjacent bearing of the cyclometer is not only closed tight, but the star-wheel is held forcibly by the spring against the nut $a^{28}$, so as still further to insure that the closure shall be absolutely dust-tight, and also the spring $a^{29}$ acts as a brake to prevent the star-wheel from being otherwise than positively moved, this construction having also many other obvious advantages.

As many number-wheels may be employed as desired, and preferably these will all be substantially similar, so that a description of one will answer for all.

Viewing Fig. 3, it will be observed that I have provided at the left-hand part of the instrument four number-wheels $a^{30}$ $a^{31}$ $a^{32}$ $a^{33}$, the last having the lowest denomination and increasing by multiples of ten toward the left, so that the whole number will read properly through the sight-opening $a$ when holding the instrument with the star-wheel to the left in the position shown in Fig. 2. These number-wheels are properly mounted on the sleeve $a^{14}$, as shown in Fig. 3, and a wheel $a^{34}$, Fig. 17, but preferably unnumbered, is then mounted on the shaft $a^{16}$, to be turned thereby and thereby actuate the train of number-wheels, as will now be described.

Viewing Fig. 10, it will be observed that the sleeve $a^{14}$ is provided with a plurality of knobs or lumps $a^{35}$, having narrow slots $a^{36}$ between them. These slots receive, respectively, the several number-wheels and permit the latter to rotate freely on the sleeve at the proper times, said wheels being each provided with an internal notch $a^{37}$, as shown in Fig. 8, to permit it to be placed on the sleeve over the lump $a^{35}$. Within and next to each number-wheel I place rigidly on the sleeve a dwell-wheel $a^{38}$, Fig. 7, provided with a plurality of notches or peripheral dwells adapted to receive a spring $a^{39}$, carried by the adjacent number-wheel, so as to permit the latter to be moved a notch at a time, this movement being accomplished by the mechanism shown in Fig. 7 and consisting of a dog or detent $a^{40}$, freely pivoted at $a^{41}$ to the back of the preceding number-wheel, and a pinion or idler $a^{42}$, also freely pivoted on the preceding number-wheel, said pinion normally idly engaging the internal teeth $a^{43}$ of the next succeeding higher number-wheel and being in range with the free end of the detent, so that every time the latter is raised by coming in contact with the adjacent lump $a^{35}$ in the position shown in Fig. 8 the detent locks the idler $a^{42}$ against idle rotation, and thereby moves the meshing number-wheel the space of one figure, as desired. From this description it will be understood that every time the wheel $a^{34}$ is rotated it will move the wheel $a^{33}$ one number, and every ten numbers that the latter is moved it in turn will move the wheel $a^{32}$ one number, the latter moving the wheel $a^{31}$ every tenth time it is moved forward, and so on, the detent $a^{40}$ and idler $a^{42}$ being entirely inoperative, excepting when the tenth move of their number-wheel renders them operative by the engagement of the detent with the lump or knob $a^{35}$.

The notches $a^{37}$ of the number-wheels are so placed relatively to the dwells of the dwell-wheels $a^{38}$ that the number-wheels are always stopped in such a position that their said notches cannot register with the lumps $a^{35}$, and by this means the wheels are positively locked against longitudinal or shifting movement on their supporting-sleeve.

Fig. 23 illustrates in detail the means which I have invented for securing the wheels on their actuating-shaft, said means consisting of a relatively heavy split disk $a^{44}$, of spring metal, having a central aperture $a^{45}$, slightly smaller than the shaft $a^{16}$, so that by wedging the said disk apart it may be slid onto said shaft, and when released it grips the shaft firmly, so as to lock the parts in proper snug relation, this said locking means being of much advantage in my invention when it is remembered that by the arrangement of the number-wheels as already described, in which the lowest number-wheel is at the right or toward the free end of the shaft, thereby any desired number of these wheels may be used simply by adding additional wheels to those already in place, the split disk permitting this variation readily and also being an extremely convenient means for holding the parts compactly, taking up wear, &c.

Viewing Fig. 3, it will be seen that I have provided at the right of the locking-disk $a^{44}$, just mentioned, a further set of number-wheels and connected mechanism, this part of my invention being a counter capable of resetting, so that a person may, for instance, record the total mileage of an extended trip by means of the counters viewed through the sight-openings $a$, and also without disturbing—and, indeed, without the possibility of disturbing—the counters may take the record of the daily ride by the counters viewed through the sight-opening $a'$, resetting these counters to zero each morning. The shaft $a^{16}$ has mounted thereon a sleeve $a^{46}$ on its head $a^{47}$, secured to the barrel by the set-screw $a^6$ and on which are mounted any number of number-wheels, two being herein shown, $a^{48}$ $a^{49}$, similar to those already described and similarly operated by a wheel $a^{50}$, substantially like the wheel $a^{34}$, excepting that it is not directly rotated by the shaft $a^{16}$, but is rotated by a resetting device $a^{51}$. The latter is preferably numbered on its periphery, as indicated at $a^{52}$, Fig. 18, these numbers having, preferably, a different color, as red, to distinguish them from the number of the other wheels, which may be black, the red numbers indicating, preferably, fractions of distances, as tenths of miles, while the black numbers indicate miles or multiples thereof. The resetter $a^{51}$ is held in place by the ring $a^8$ and has a shoulder $a^{53}$, projecting slightly beyond said ring $a^8$, in order that a thumb-disk $a^{54}$, Fig. 19, carried thereby, may have free movement, as presently described, the hub $a^{55}$ of the resetter having external threads $a^{56}$, internal threads $a^{57}$, radial cuts $a^{58}$, and an internal flange or shoulder $a^{59}$. Against the latter I place a loose coupling-collar $a^{60}$, Fig. 21, fitted to turn with the shaft $a^{16}$ and normally held clamped against the shoulder $a^{59}$ by a washer $a^{61}$, whose lugs $a^{62}$ are held in the grooves $a^{58}$, said washer being pressed against the collar $a^{60}$ by a screw-threaded tightening-nut $a^{63}$, constituting, with the other parts last mentioned, a coupling device for coupling the resetter and number-wheels to the shaft, said nuts being screwed into the hub $a^{55}$ of the resetter and held against accidental removal by a fine threaded thimble or collar $a^{64}$, whose flange $a^{65}$ seats in a groove $a^{66}$ between the threads and head of the nut $a^{63}$.

By the provision of the last-mentioned mechanism the resetter $a^{51}$ may be instantly clamped to the actuating-shaft by the intermediate loose collar $a^{60}$, and because of the interposed washer $a^{61}$ the turning of the tightening-nut $a^{63}$ cannot possibly rotate said shaft, but is caused to bring simply a direct end thrust or pinching engagement of the parts with the collar $a^{60}$; also, by reason of the difference in pitch of the threads of the tightening-nut and the thimble $a^{64}$ the thimble cannot be removed, but can only be turned until the ends of its threads come in contact with the flange $a^{65}$ of the said thimble or collar.

By the term "coupling means or device" I mean means which is capable of uncoupling the number-wheels from the driving mechanism, so that they become idle even though the driving mechanism continues to operate.

The arrangement is such that the driving-shaft can be operated backward or forward to any extent without affecting in any degree any of the wheels when the mechanism is uncoupled.

I positively and actually uncouple the wheels from the driving mechanism, so that they are entirely out of driven or connected relation with the driving-shaft, and this is what I mean by the words "coupling mechanism"—viz., mechanism which is capable of coupling the parts together for being positively operated by the driving mechanism and is capable of uncoupling the driving-wheels, so that they cannot be operated when so uncoupled.

In Fig. 4 I have shown all the counters or number-wheels as capable of being reset, and in Fig. 5 I have omitted the resetting mechanism entirely, the right-hand end of the barrel being closed in this instance simply by a flanged cap $a^{67}$, which performs the offices of the retaining-ring $a^8$, besides closing the barrel.

In use my improved cyclometer, supposing that it is to be used with a bicycle, is secured adjacent the front wheel—for instance, at the right-hand side of the bicycle. It is of considerable importance that a cyclometer should be secured at this side of the wheel, inasmuch as it is thereby out of danger of collision when passing to the right of other riders, and it is more convenient for inspection, and otherwise conforms to the preferences of riders, this advantage being further enhanced in my invention by reason of the fact that when so placed the figures are readable directly from left to right by the rider without inconvenience. As the star-wheel $a^{20}$ is rotated step by step in the usual manner its pinion $a^{22}$ rotates the oppositely-balanced idlers $a^{23}$, held against revolution on the plate $a^{10}$ and meshing with the internal teeth of the disk $a^{24}$, thereby rotating the latter and causing its eccentrically-carried pinion $a^{25}$ to travel against the stationary gear $a^{18}$ and the movable gear $a^{17}$, whose differential teeth cause the movable gear and its connected shaft $a^{16}$ to rotate at proper reduced speed. The rotation of the central actuating-shaft $a^{16}$ correspondingly rotates the wheel $a^{34}$, which, as shown in Fig. 3, is unnumbered, and therefore rotates the adjacent units-wheel $a^{33}$ once in every ten revolutions, and the latter in turn moves the wheel $a^{32}$ one number for every complete rotation which it (the wheel $a^{33}$) makes.

In Fig. 5 I have shown a wheel $a^{340}$, which is in all essential respects identical with the wheel $a^{34}$, excepting that it is numbered and visible through the sight-opening, as is clearly apparent viewing said figure. As the wheel $a^{34}$ (and the same is true of all the number-wheels) rotates, and thereby carries a detent $a^{40}$ and idle pinion $a^{42}$ around with it, said detent engages a lump $a^{35}$ once in every revolution and is thereby raised, as shown in Fig. 8, so as to lock the pinion against rotation and cause it to pull or drag with it the next preceding number-wheel until the detent has ridden over and fallen behind the lump, whereupon the pinion $a^{42}$, being no longer held against rotation, ceases to positively move the next number-wheel, and the latter is simultaneously held against accidental movement by the engagement of its spring $a^{39}$ with the next dwell of the dwell-wheel $a^{38}$, its movement, however, due to the detent-and-lump action, as stated, having moved it one number, so as thereby to count one mile or other denomination of distance. As long as the number-wheels shown in Fig. 4 and at the right, Fig. 3, are clamped in train with the actuating-shaft $a^{16}$ they operate precisely as already explained in connection with the other wheels $a^{34}$ $a^{33}$, &c.; but if it is desired to reset the counter the operator simply turns back the nut $a^{63}$, so as to release the collar $a^{60}$ from its clamped position between the washer $a^{61}$ and shoulder $a^{59}$ of the resetter $a^{51}$, and thereupon the adjacent number-wheels may be quickly reset by turning them in either direction by means of the milled thumb-disk $a^{54}$, this disk having free movement relatively to the barrel A and being clamped rigidly between the shoulder $a^{53}$ of the resetter and the collar $a^{64}$ threaded thereon, this collar also serving, as explained, to prevent removal and accidental loss of the tightening-nut $a^{63}$.

One advantage of the quick resetting feature of my invention is that thereby a racer, for instance, may reset his cyclometer exactly on the scratch no matter how much he may have ridden immediately previous thereto.

I am aware that there have been heretofore pawl-and-ratchet resetting mechanisms in which, however, the resetting could be done by movement in one direction only and in which the still more objectionable fault existed that the resetting could not be accomplished with any accuracy, because if, for instance, the ratchet-wheel had twenty teeth then the resetting had to be accomplished in twentieths of miles, whereas by my invention the resetting can be accomplished with absolute accuracy. The wheels may be turned back to zero and clamped directly in said position irrespective of the position of any of the rotating parts.

I regard the provision of a central actuating-shaft as broadly new. This arrangement not only enables me to produce an exceedingly compact device in which also the strains are centralized, but, furthermore, it enables me to mount additional number-wheels as desired. Moreover, this actuating-shaft rotates at the proper reduced speed desired for the first number-wheel. This is also entirely new.

A further improvement resides in placing all the reducing mechanism immediately adjacent the star-wheel, not only thereby economizing space and securing various other advantages, but preventing the twists and strains which would otherwise be brought at opposite ends of the instrument, thereby rapidly wearing out the delicate parts thereof; and not least of the features which I intend herein to cover is the provision of an internal thin sheet lining, whereby the instrument is rendered as nearly dust-proof as possible. This lining is crowded out and pinched tightly between the barrel and the retaining-ring $a^8$ at one end and is held equally snugly and firmly by the head $a^{13}$ at the other end, and in the form of instrument shown in Fig. 3 is held intermediately by the head $a^{47}$. This lining is also, as stated, preferably transparent, so that the barrel may be cut away in as many places as desired to expose the numbers of the internal mechanism for inspection and observation.

Substantially all the mechanism of the instrument may be first assembled in compact form on the central shaft and in its head and then bodily inserted in the barrel or case.

Other novel features of my invention are set forth in the following claims, and I wish it understood that I am not limited to particular constructions otherwise than as stated in said claims, inasmuch as various changes and modifications in form, combination, and relation of parts may be resorted to within the spirit and scope of my invention, and my invention is not restricted to technical cyclometers, inasmuch as it is capable of many other uses, and by the term "cyclometer" in the claims I mean to include any instrument within the scope of my invention as heretofore defined.

Having fully described my invention, what I claim, and desire to secure by Letters Patent, is—

1. A cyclometer having a plurality of number-wheels, a central rotatable actuating-shaft extending concentrically through all of said number-wheels, reducing mechanism for rotating said shaft at the normal reduced speed required for said number-wheels, said reducing mechanism being concentric with said shaft and at one end of said shaft, and means for transmitting the initial motion from the device whose speed is being measured, said means being coaxial with said shaft, said reducing mechanism being located between said transmitting means and said shaft, substantially as described.

2. A cyclometer having a plurality of number-wheels, an actuating-shaft therefor, and coupling means operable from the outside of the instrument for instantly coupling or uncoupling said wheels from driving engagement with said shaft, substantially as described.

3. In a cyclometer, a plurality of number-wheels, an actuating-shaft therefor, said wheels being permanently connected with and driven by said shaft, a second plurality of number-wheels, and coupling means operable externally for uncoupling said second set of wheels from said shaft and resetting them as desired, substantially as described.

4. In a cyclometer, a plurality of number-wheels, an actuating-shaft therefor, and means to set said wheels at any circumferential point desired relatively to said shaft, substantially as described.

5. In a cyclometer, the combination with an actuating-shaft, of a wheel mounted loosely on said shaft for resetting purposes, said wheel having an internal shoulder, a coupling-collar mounted to turn with said shaft and adapted to bear against said shoulder, and means to clamp said collar rigidly against said shoulder to turn said wheel with said shaft, substantially as described.

6. In a cyclometer, the combination with an actuating-shaft, of a wheel mounted loosely on said shaft for resetting purposes, said wheel having an internal shoulder, a coupling-collar mounted to turn with said shaft and adapted to bear against said shoulder, a washer loose on said shaft and mounted to rotate with said wheel, and a tightening-nut bearing against said washer and to clamp said collar between said shoulder and washer, thereby to drive said wheel from said shaft, substantially as described.

7. In a cyclometer, the combination with an actuating-shaft, of a resetting-wheel mounted loosely on said shaft and having an internal shoulder and internal and external threads out of pitch with each other, a collar mounted to turn with said shaft and adapted to bear against said shoulder, a tightening-nut threaded to fit said internal threads and adapted to clamp said collar against said shoulder, and a thimble or collar threaded on said external threads and having a flange loosely engaging said nut, the latter being provided with an annular recess between its head and its threads to receive said flange, as and for the purpose described.

8. In a cyclometer, a barrel, a plurality of number-wheels mounted therein, a central actuating-shaft, a resetter for said wheels, a retaining-ring in the end of said barrel serving to retain said wheels and resetter, said resetter having an external shoulder projecting slightly beyond said ring, and an external threaded hub beyond said shoulder, a collar screwed on said threaded hub, and a thumb-disk clamped between said shoulder and said collar, substantially as described.

9. In a cyclometer, a stationary sleeve having a lump thereon, a number-wheel rotating on said sleeve, and having an internal gear, a wheel at the side of said internal gear and concentric therewith, means to rotate said last-mentioned wheel, said wheel being provided with a detent freely pivoted thereon, and with a pinion also freely pivoted thereon and extending in mesh with said internal gear, said detent being arranged to ride upon said lump and thereby engage said pinion, to lock the same momentarily in engagement with said internal gear, thereby to move said number-wheel, substantially as described.

10. In a cyclometer, a stationary sleeve having a lump thereon, a number-wheel rotating on said sleeve and having an internal gear, a wheel at the side of said internal gear and concentric therewith, means to rotate said last-mentioned wheel, said wheel being provided with a detent freely pivoted thereon, and with a pinion also freely pivoted thereon and extending in mesh with said internal gear, said detent being arranged to ride upon said lump and thereby engage said pinion, to lock the same momentarily in engagement with said internal gear, thereby to move said number-wheel, a plurality of dwells about said sleeve, and means carried by said number-wheel to yieldingly engage said dwells, substantially as described.

11. In a cyclometer, a plurality of toothed number-wheels, the lower number-wheels being each provided with a normally idle pinion in mesh with the teeth of the next higher wheel, a detent for said pinion normally inoperative, a lump for operating said detent, and means to engage said detent with said lump at the proper time, to lock said pinion and thereby momentarily move the next higher number-wheel, substantially as described.

12. In a cyclometer, a barrel or casing, a sleeve immovably secured in said barrel, said sleeve having a series of lumps along its length separated by circumferential grooves, in combination with a plurality of number-wheels having central apertures to fit said sleeve, and notches to straddle said lumps, a plurality of circumferential dwells between the successive number-wheels, and a holding device carried by said number-wheels to engage said dwells, said notches being so disposed that they are out of register with said lumps when the numbering-wheels are held by the engagement of their holding devices with the dwells, whereby the numbering-wheels are free to turn in said grooves but are locked against longitudinal movement on the sleeve, substantially as described.

13. A cyclometer comprising a barrel and number devices, said barrel having one or more sight-openings through which said numbering devices may be seen, combined with a thin sheet lining extending from end to end of said barrel and between the barrel and numbering devices, said lining being transparent opposite said sight-openings, substantially as described.

14. The combination with a barrel having one or more sight-openings, of a sheet-celluloid lining extending entirely about said barrel on its inner surface and from end to end thereof, and means to clamp said lining tightly against the said inner surface of the barrel, substantially as described.

15. In a cyclometer, a barrel having one or more sight-openings, a thin sheet lining for the inner surface of said barrel, a sleeve within the barrel, said sleeve carrying a flanged head at one end, the flange thereof engaging said lining and pressing it tightly against the inner surface of the barrel, and a flanged retaining device at the opposite end of the drum, the flange thereof engaging and pressing said lining against the inner surface of the barrel, substantially as described.

16. A cyclometer, comprising a barrel having one or more sight-openings therein, a thin sheet lining for the inner surface of the barrel, and a plurality of ring-like devices engaging and pressing said lining against the inner surface of said barrel, substantially as described.

17. A cyclometer, comprising a barrel, a central sleeve having a flanged head, a plate held in the free end of said flanged head, speed-reducing mechanism carried by and within said head, an actuating-shaft extending through said sleeve, a plurality of number-wheels mounted on said sleeve, means connecting said wheels with said shaft, and a retaining device to retain said mechanism in place, whereby all of said mechanism is held together and is capable of being bodily removed from or placed in said barrel, substantially as described.

18. In a cyclometer, the combination with a central actuating-shaft, means at one end thereof for operating the same, a plurality of number-wheels concentric therewith, the lower number-wheels being farthest removed from said operating means, connections between said number-wheels and said shaft, and a heavy spring-disk provided with a central aperture slightly smaller than said shaft and radially split in order that it may be sprung onto said shaft in clamping engagement therewith at any point along the length of the shaft, substantially as described.

19. In a cylcometer, the combination with an angular shaft, of a heavy spring-disk having a central aperture corresponding in shape and slightly smaller than said shaft, and radially split in order that it may be sprung onto said shaft in clamping engagement therewith at any point along the length of the shaft, substantially as described.

20. A cyclometer, its casing, a star-wheel at one end of said casing, said star-wheel being provided with a spindle entering the cyclometer and connecting with the internal mechanism thereof to operate it, said spindle having a fixed collar thereon within the casing, and the casing having a cap or flange adjacent to the star-wheel surrounding said spindle, and a spring interposed between said flange and said collar, whereby the star-wheel is held inwardly tightly against the end of the casing, substantially as described.

In testimony whereof I have signed my name to this specification in the presence of two subscribing witnesses.

ARTHUR A. LEUCHTER.

Witnesses:
GEO. H. MAXWELL,
GEO. W. GREGORY.